United States Patent
Liu et al.

(10) Patent No.: US 11,297,686 B2
(45) Date of Patent: Apr. 5, 2022

(54) PERVASIVE COMPUTING

(71) Applicant: ZTE Corporation, Guangdong (CN)

(72) Inventors: Fulei Liu, Guangdong (CN); Jingyi Zhou, Belle Mead, NJ (US); Meiqing Huang, Guangdong (CN)

(73) Assignee: ZTE Corporation, Shenzhen (CN)

(*) Notice: Subject to any disclaimer, the term of this patent is extended or adjusted under 35 U.S.C. 154(b) by 126 days.

(21) Appl. No.: 16/969,901

(22) PCT Filed: Feb. 22, 2018

(86) PCT No.: PCT/CN2018/076953
§ 371 (c)(1),
(2) Date: Aug. 13, 2020

(87) PCT Pub. No.: WO2019/161527
PCT Pub. Date: Aug. 29, 2019

(65) Prior Publication Data
US 2021/0014933 A1      Jan. 14, 2021

(51) Int. Cl.
*H04W 84/18* (2009.01)
*H04W 76/20* (2018.01)
(Continued)

(52) U.S. Cl.
CPC ...... *H04W 84/18* (2013.01); *G06Q 10/06315* (2013.01); *H04W 74/002* (2013.01); *H04W 76/20* (2018.02); *G06Q 50/10* (2013.01)

(58) Field of Classification Search
CPC ... H04W 84/18; H04W 74/002; H04W 76/20; H04W 84/04; H04W 88/06;
(Continued)

(56) References Cited

U.S. PATENT DOCUMENTS

2012/0191842 A1  7/2012  Hu et al.
2015/0373117 A1* 12/2015  Gleyzer ............... G06F 9/5077
                                                      709/215

FOREIGN PATENT DOCUMENTS

AU    2015201542 A1    4/2015
CN     102024204 A     4/2011
(Continued)

OTHER PUBLICATIONS

Liang, Chengchao, and F. Richard Yu. "Wireless virtualization for next generation mobile cellular networks." IEEE wireless communications 22.1 (2015): 61-69.*

(Continued)

*Primary Examiner* — Sharad Rampuria
(74) *Attorney, Agent, or Firm* — Perkins Coie LLP (57) ABSTRACT

Methods, systems, and devices related to the convergence of networking and computing capabilities are described. In one representative aspect, a method for application development is described. The method includes making available a first set of services for an application in a domain. The domain corresponds to an industry having a set of business rules, and the first set of services is structured to invoke a second set of services pre-deployed on a first set of communication nodes. The second set of services includes common functionalities according to the set of business rules in the domain. The method also includes deploying the first set of services on a second set of communication nodes to enable an execution of a subset of the business rules in the domain that is specific to the application.

19 Claims, 6 Drawing Sheets

(51) Int. Cl.
*G06Q 10/06* (2012.01)
*H04W 74/00* (2009.01)
*G06Q 50/10* (2012.01)

(58) Field of Classification Search
CPC .. G06Q 10/06315; G06Q 50/10; H04L 67/10; H04L 67/20; H04L 12/4604
See application file for complete search history.

(56) References Cited

FOREIGN PATENT DOCUMENTS

| | | |
|---|---|---|
| CN | 103258027 A | 8/2013 |
| CN | 107145605 A | 9/2017 |
| WO | 2016148560 A1 | 9/2016 |

OTHER PUBLICATIONS

Office Action for Chinese Patent Application No. 201880080499.8, dated Oct. 27, 2021 (26 pages).
Bin, Huangfu, "Research on Intelligent Parking; System Based on Pervasive Computing," China Master's Theses Full-text Database, Information Technology, May 15, 2013 (English abstract provided).
International Search Report and Written Opinion dated Nov. 13, 2018 for International Application No. PCT/CN2018/076953, filed on Feb. 22, 2018 (7 pages).

\* cited by examiner

PERVASIVE COMPUTING

CROSS REFERENCE TO RELATED APPLICATIONS

This patent document claims the benefit of priority to International Patent Application No. PCT/CN2018/076953, filed on Feb. 22, 2018. The entire contents of the beforementioned patent applications are incorporated by reference as part of the disclosure of this application.

TECHNICAL FIELD

This patent document is directed generally to computing technology and network communications.

BACKGROUND

Mobile communication technologies are moving the world toward an increasingly connected and networked society. The rapid growth of mobile communications and advances in technology have led to greater demand for capacity and connectivity. In particular, ultra-low latency, high bandwidth, and real-time access to radio network information has become key features demanded by application development.

SUMMARY

This document discloses methods, systems, and devices related to a convergence of computing and networking capabilities in a distributed computing and network. The network can provide computing capabilities throughout the network communication paths.

In one representative aspect, a method for application development is disclosed. The method includes making available a first set of services for an application in a domain, wherein the domain corresponds to an industry having a set of business rules, and wherein the first set of services is structured to invoke a second set of services pre-deployed on a first set of communication nodes, the second set of services including common functionalities according to the set of business rules in the domain; and deploying the first set of services on a second set of communication nodes to enable an execution of a subset of the business rules in the domain that is specific to the application.

In another representative aspect, a method for service development is disclosed. The method includes making available a set of services that invokes a set of infrastructure-level components, wherein the set of services includes common functionalities according to a set of business rules in a domain, the domain corresponding to an industry having the sets of business rules, and wherein the set of infrastructure-level components includes at least one of a network component, a storage component, or a virtualization component; testing the set of services with the set of infrastructure-level components; and deploying the set of services to one or more communication nodes that host the set of infrastructure-level components.

In another representative aspect, a method for providing networking and computing services is disclosed. The method includes hosting, at a first communication node in a network, a set of infrastructure-level components that includes at least one of a network component, a storage component, or a virtualization component; providing, by a second communication node in the network, a first set of services for an application in the domain to enable an execution of a subset of the business rules in the domain that is specific to the application; and providing, by a third communication node in the network, a second set of services that includes common functionalities according to a set of business rules in a domain, wherein the domain corresponds to an industry having the set of business rules.

In another representative aspect, a device for providing network and computing services is disclosed. The device includes a transceiver coupled to a network for transmitting or receiving information over a communication channel to allow network access by a device; and a processor in communication with the transceiver to manage transmitting or receiving the information, wherein the processor is further configured to provide, to the device: a first set of services for an application in the domain to enable an execution of a subset of the business rules in the domain that is specific to the application; and a second set of services that includes common functionalities according to a set of business rules in a domain, wherein the domain corresponds to an industry having the set of business rules.

In another representative aspect, a system for providing network and computing services is disclosed. The system includes a first communication node providing network access to a device via an access network; and a second communication node in communication with the first communication node. The second communication node comprises a processor configured to provide, to the device: (1) a first set of services for an application in the domain to enable an execution of a subset of the business rules in the domain that is specific to the application; and (2) a second set of services that includes common functionalities according to a set of business rules in a domain, wherein the domain corresponds to an industry having the set of business rules.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

Networking capabilities include functions responsible for transporting data correctly and efficiently from one place to another. Computing capabilities include functions responsible for exercising business logic of applications. Rapid advances in mobile communication technologies are moving the world toward an increasingly connected and networked society, yet networking and computing functionalities remain two separate notions.

The hierarchical network design, which is commonly adopted in current networks, introduces long latency in delivering data generated on edge (e.g., data generated by user devices and delivered to base stations in an access network) to the cloud (e.g., computing servers located at the other end of the network) for analysis and decision making Application-level business logic cannot be asserted at or near the point where data is generated. Applications such as high-resolution video broadcast, Augmented Reality (AR), or Virtual Reality (VR) incur a significant amount of backhaul cost and packet delay. Distributing such application-level business logic across the network poses significant complications to application design, implementation, testing, and deployment.

There have been some attempts to address such issues. For example, Over-The-Top (OTT) applications follow a media distribution practice that allows a streaming content provider to sell audio, video, and other media services directly to the consumer over the internet, bypassing telecommunications, cable, or broadcast television service providers that traditionally act as a controller or distributor of such content. However, the OTT applications cannot anticipate network conditions (e.g., network congestion, packet drop, and/or connection rejection). Design, implementation, and operation of networking, computing, and applications remain separate and complex—additional development cost is often necessary to integrate various aspects together to provide the desired services.

Multi-access edge computing (MEC) is another attempt to address the above issues. MEC offers application developers and content providers cloud-computing capabilities and an information technology service environment at the edge of the network. However, MEC application servers may be deployed only to somewhere near base stations and thus constitute a small portion of the network. MEC fails to provide an entire distributed network that offers computing capabilities to application developers and content providers.

The patent disclosure describes a programming paradigm, also known as Pervasive Computing that provides computing capabilities throughout the network communication paths. In the era of communication technology and information technology convergence, the computing functions and capabilities demanded by applications can be entrenched into communication nodes, such as wireless communication nodes in the access network, or various network nodes (e.g., Mobility Management Entity (MME), Serving Gateway(SGW), Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), a Policy Control Function (PCF), routers, switches, and aggregation gateways) in the backbone/core network. Leveraging this new computing paradigm and the associated network systems, application developers can focus on development of application-level business logic without wasting development cycles to test and deploy infrastructure-level services.

Figure 1:
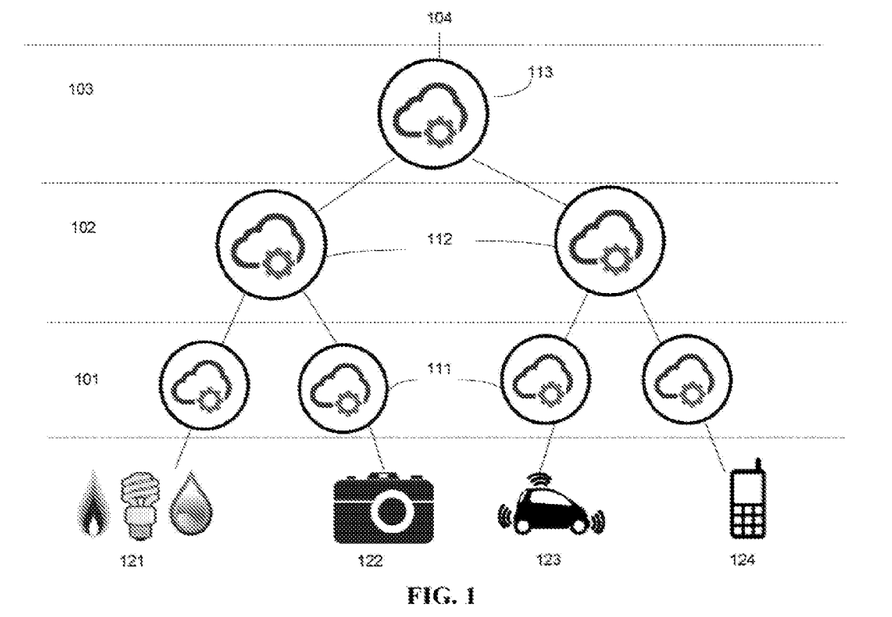
FIG. 1 is a schematic illustration of a system architecture of Pervasive Computing.

FIG. 1 is a schematic illustration of a system architecture of Pervasive Computing. The Pervasive Computing system distributes computing, storage, and networking throughout communication paths. In this hierarchical Pervasive network, Pervasive nodes provide various capabilities on different tiers.

Lower-tier Pervasive Computing node: Lower-tier Pervasive Computing nodes 111 are deployed in the access tier 101 (e.g., base stations, femtocells, or other communication nodes in the access network and/or core network) so that they are situated near the applications and/or users. The Pervasive computing nodes are suitable for providing data collection and processing capabilities to users and/or applications in different vertical domains. Each domain corresponds to an industry that have a unique set of business requirements. For example, as shown in FIG. 1, the lower-tier Pervasive nodes can provide energy services to applications in the utility domain 121, image processing services to applications in video/image surveillance domain 122, location services to applications in autonomous vehicle domain 123, and a combination of data processing services and location services to application in mobile users 124.

Middle-tier Pervasive Computing node: Middle-tier Pervasive nodes 112 are deployed in the middle tier 102 (e.g., the distribution layer). Geographically they are located further from the applications and/or users and can be used to converge data from the lower-tier pervasive computing nodes to provide more centralized computing capabilities (e.g. ML, AI) and processing power for the converged data.

High-tier Pervasive Computing: High-tier Pervasive Computing nodes 113 are deployed in the high tier 103 (e.g., the core layer). In some embodiments, they can be deployed next to the cloud 104. The high-tier Pervasive Computing nodes can transfer a large quantity of data to the cloud 104. They can also provide resource pooling and real-time processing on at least a portion of the data while the cloud 104 deals with massive storage, heavy-duty computation, and global coordination.

As shown in FIG. 1, the architecture of Pervasive Computing network is consistent with the hierarchical or mesh design that is commonly adopted in the current networks. By having Pervasive Computing nodes situated in each tier of the network hierarchy (or in distributed locations in a mesh), computing capabilities can be provided at or close to where the data is generated and/or transferred. The entire Pervasive network can provide distributed computing capabilities while accomplishing storage and network communication functionalities.

Figure 2:
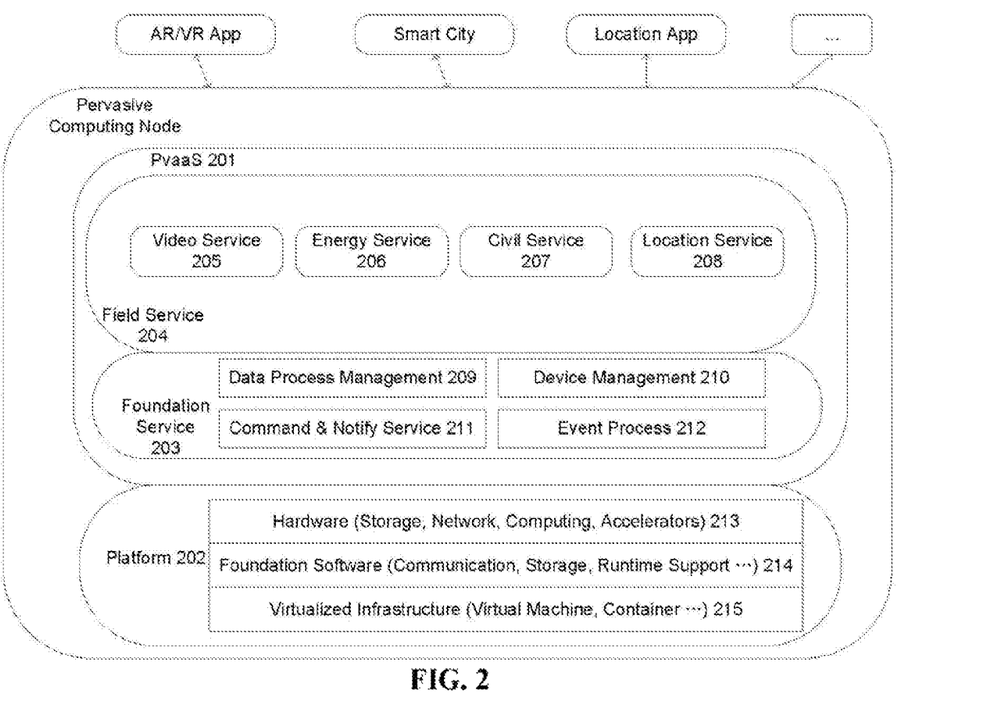
FIG. 2 is a schematic illustration for a representative architecture of a Pervasive Computing node.

FIG. 2 is a schematic illustration for a representative architecture of a Pervasive Computing node. Each Pervasive Computing node includes Services known as Pervasive Computing as a Service (PvaaS) 201 and a corresponding platform 202 to provide infrastructure for the PvaaS. Details of the PvaaS and the platform are discussed below.

Pervasive Computing as a Service (PvaaS)

The PvaaS 201 provides a new development paradigm that allows application developers to leverage Pervasive Computing nodes at different tiers to accomplish computing tasks for a large amount of data. PvaaS includes at least two categories of services: Common Application Services (also known as Foundation Services 203), and Application Specification Services (also known as Field Services 204).

Field Service

Field Service is a unique set of services provided by Pervasive Computing. Field Service provides application-specific functionalities in the form of services that pertain to various vertical domains. For example, Field Service can include application-specific video services 205, energy services 206, utility/civil services 207, and/or location services

208. Because Field Services are co-located with communication nodes distributed across the network, from the perspective of applications/users, the network now provides virtualized (or logical) groupings of application-specific services.

For example, video services 205 can provide application-specific encoding/decoding capabilities and image processing for video application (e.g., AR/VR applications). Energy services 206 can provide data format transformation and computations specific for energy applications (e.g., wind turbine control, electricity generation, coal mining). Utility/civil services 207 can provide data monitoring and compilation for utility applications (e.g., water usage, electricity monitoring). Location services 208 can provide data format transformation and specific algorithms for location and navigation application. It is noted that FIG. 2 only demonstrates a few examples of the Field Services that can be provided by the Pervasive nodes. The list of services can be expanded based on user needs.

Foundation Service

Foundation service includes common and essential functions for one or more vertical domain. In some embodiments, foundation services may include common functions for a vertical domain based on use cases and/or requirements in that domain. For example, the Foundation Service can encapsulate common functions of a domain into a set of Application Programming Interfaces (APIs).

The Foundation Service provides common functions to support various Field Services. The common functions include and are not limited to: data process management 209, device management 210, command and notify service 211, and event process 212. Because Pervasive Computing nodes are deployed in a hierarchical and distributed manner, these common functions can similarly be provided to various applications in a distributed manner (e.g., across different tiers). During the execution of the PvaaS, application-specific Field Service can invoke some of the common services provided by the Foundation Service.

Platform

The platform 202 includes infrastructure-level software and hardware components that can be commonly considered as Infrastructure as a Service (IaaS) and/or Platform as a Service (PaaS). In particular, the platform includes hardware components 213 such as chips, sensors, actuators, accelerators, etc. The hardware components allow PaaS to provide common services, such as computing, storage, network, acceleration, and security, across different domains. The software components 214 include software that can manage and orchestrate capabilities such as communication, data transmission, runtime, and/or storage. The platform may also include virtualized infrastructure 215 such as virtual machines or containers. In some embodiments, the Foundation Services can be embedded within the platform to form the firmware of the Pervasive Computing node.

In some embodiments, the middle-tier and high-tier Pervasive Computing nodes provide the same Foundation Services and Field Services as the Pervasive Computing nodes. In some embodiments, each tier provides different Foundation Services and Field Services. In some embodiments, the Pervasive Computing nodes provides a subset of Foundation Services and Field Services of the services offered by the middle-tier and high-tier Pervasive nod.

By offering field Services and Foundation services on Pervasive Computing nodes, Pervasive Computing can significantly simplify the application development cycle. For example, selected Field Services and corresponding Foundation Service can be tested together with Infrastructure as a Service (IaaS) and/or Platform as a Service (PaaS) in a Software-Defined Networking (SDN) environment. The tested Foundation Services and Field Services are deployed together to various tiers of Pervasive Computing nodes, allowing application developers and content providers to focus on application-level business logic without testing/deploying lower-level infrastructure capabilities. In some embodiments, Field Services can be implemented, tested, and/or deployed separately from Foundation Service. For example, Foundation Service can be developed, tested, and/or deployed separately. Field Service, on the other hand, can be developed and/or tested prior to or along with development of upper-level logic of an application (e.g., presentation layer that includes user interface and control) due to its application-specific nature. During Field Service development, developers can invoke pre-tested and pre-deployed Foundation Service without developing or testing these common functionalities repeatedly. This new development paradigm allows cohesive development between infrastructure and application functions.

Figure 3:
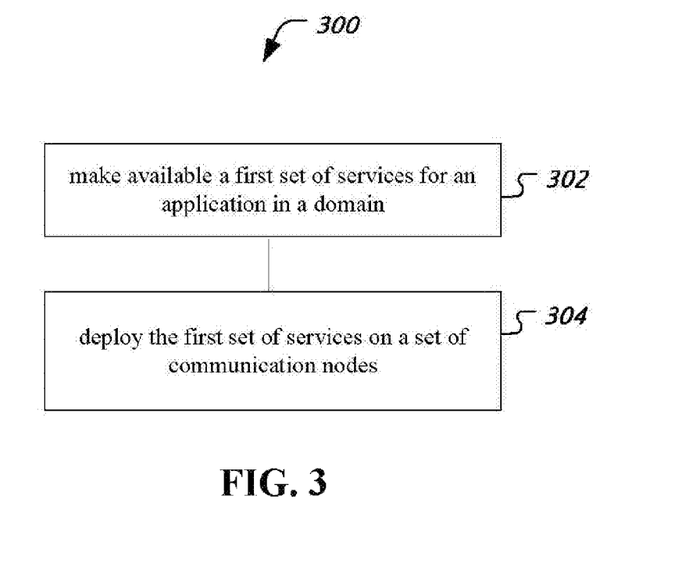
FIG. 3 is a flowchart representation for a method for application development.

FIG. 3 is a flowchart representation for a method 300 for application development that can be enabled by Pervasive Computing. The method 300 demonstrate a new application development approach that allows only a part of application (i.e., Field Services) to be developed. The method 300 includes, at 302, making available a first set of services for an application in a domain. Here, the domain corresponds to an industry having a set of business rules. The first set of services (e.g., a Field Service such as utility services) is structured to invoke a second set of services (e.g., Foundation Services) pre-deployed on a first set of communication nodes (e.g., mid-tier or high-tier Pervasive Computing nodes). The second set of services includes common functionalities according to the set of business rules in the domain. The method 300 also includes, at 304, deploying the first set of services on a second set of communication nodes (e.g., lower-tier Pervasive Computing nodes) to enable an execution of a subset of the business rules in the domain that is specific to the application.

In some embodiments, the first set of communication nodes is in a core network for wireless communication. For example, the first set of communication nodes includes a Mobility Management Entity (MME), a Serving Gateway (SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

In some embodiments, second set of communication nodes is in a core network for wireless communication. For example, the second set of communication nodes is in an access network for wireless communication.

Because the Foundation Services are pre-tested and pre-deployed to the communication nodes, there is no need for an application developer to re-develop, re-test, and re-deploy the logic provided by the Foundation Service. Application developers can thus focus on development of business logic for the Field Service and development of presentation layer logic (e.g., user interface). The use of Pervasive Computing paradigm allows a great reduction in development effort.

Figure 4:
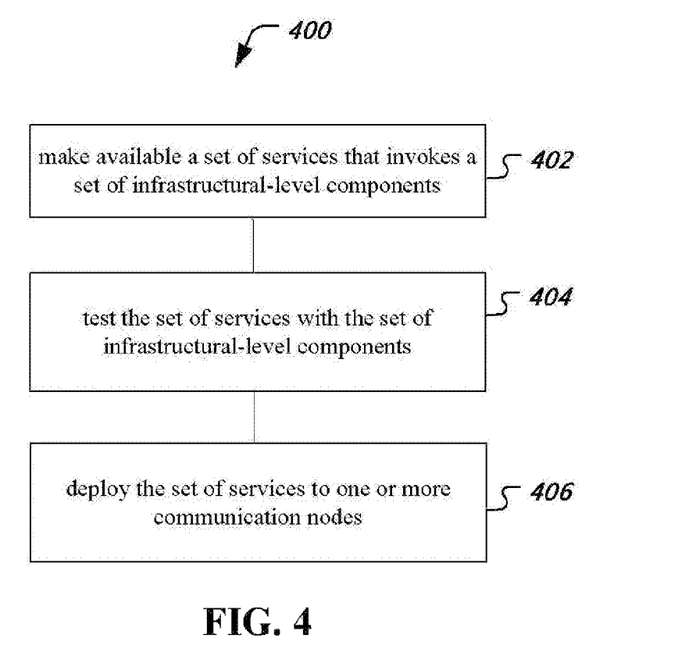
FIG. 4 is a flowchart representation for a method for service development.

FIG. 4 is a flowchart representation for a method 400 for service development that can be enabled by Pervasive Computing. The method 400 demonstrates a new testing/deployment approach that allows a part of the application (i.e., Foundation Services) to be tested/deployed with IT/CT infrastructure, such as Network as a Service (NaaS), Infrastructure as a Service (IaaS), and Platform as a Service (PaaS). The method 400 includes, at 402, making available a set of services (i.e., Foundation Services) that invokes a set of infrastructure-level components. The set of services includes common functionalities according to a set of business rules in a domain, with the domain corresponding to an industry having the set of business rules. The set of infrastructure-level components includes at least one of a network component, a storage component, or a virtualization component. The method 400 also includes, at 404, testing the set of services with the set of infrastructure-level components. The method 400 further includes, at 406, deploying the set of services to one or more communication nodes that host the set of infrastructure-level components.

In some embodiments, the network includes a core network for wireless communication. For example, the one or more communication nodes include a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

In some embodiments, the network includes an access network for wireless communication. For example, the one or more communication nodes include a base station.

The Foundation Service provides common functionalities to multiple applications in a domain. Combining testing and deployment of the Foundation Service and infrastructure-level components again saves programming and testing cycles and eliminates redundant effort by application/service developers.

Figure 5:
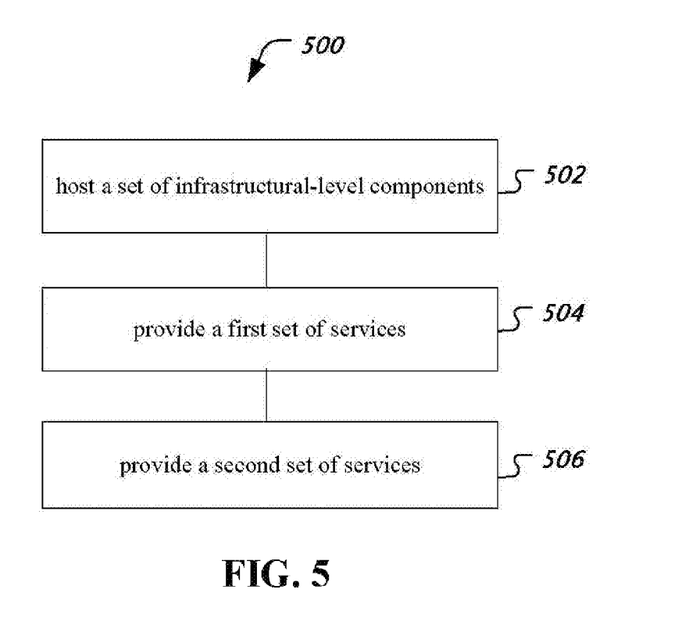
FIG. 5 is a flowchart representation of a method for providing networking and computing services.

FIG. 5 is a flowchart representation of a method 500 for providing networking and computing services. The method 500 includes, at 502, hosting, at a first communication node, a set of infrastructure-level components that includes at least one of a network component, a storage component, or a virtualization component. The method 500 also includes, at 504, providing, by a second communication node, a first set of services that includes common functionalities according to a set of business rules in a domain. Here, the domain corresponds to an industry having the set of business rules. The method 500 further includes, at 506, providing, by a third communication node, a second set of services for an application in the domain to enable an execution of a subset of the business rules in the domain that is specific to the application. The services can be provided to either end-user devices or servers.

In some embodiments, the first communication node and the second communication node are the same. That is, one Pervasive Computing node can host both Foundation Services and platform/infrastructure-level components. The third communication node can be in the core network or in the access network. In some embodiments, all the communication nodes can be different, with some of them located in the core network and the remaining located in the access network, allowing great flexibility to provide distributed computing capabilities in the network.

Details of the disclosed techniques are further explained in the following examples.

Example Embodiment 1

This embodiment demonstrates the programming paradigm provided by Pervasive Computing and its positive impact on development effort and time.

An application developer wants to develop a mobile application that allows users to find a parking spot in a parking lot. The mobile application can also show the best route to get to the parking spot using its user interface.

Traditionally, the application developer needs to develop the entire stack for the application, including the presentation layer (e.g., user interface and corresponding control logic), the business logic layer (e.g., location services), and the data/network layer. Even when there are pre-existing data/network layer components available, the developer still needs to integrate these components into the application and test them to ensure that they can work together.

With Pervasive Computing, however, the developer may only need to develop the presentation layer and a subset of the business logic layer. For example, the developer can develop the relevant business logic as Field Services and deploy these services onto communication/network nodes. In some cases, the developer can rely on pre-existing Field Services already tested and deployed on the communication/network nodes.

The developer can then test the application directly without spending time or effort to integrate and test lower-layer logics (e.g., management of business logic, data/network layer at infrastructure level) because these are provided by pre-integrated pre-tested Foundation Services and infrastructure-level components/services. Particularly, if a large part of the business logic has already been provided by pre-existing Field Services, the amount of development and testing effort can be greatly reduced.

Example Embodiment 2

This embodiment demonstrates how a Pervasive Computing node functions for an AR/VR application.

Figure 6:
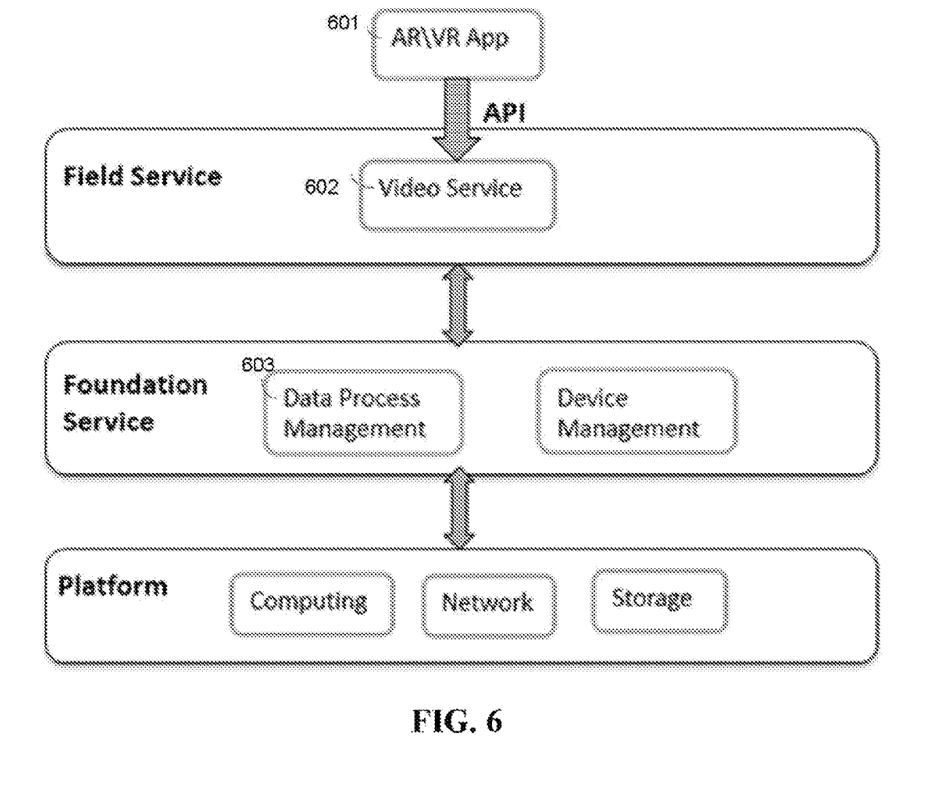
FIG. 6 demonstrate a representative architecture of a Pervasive Computing node that provides video service to Augmented Reality (AR)/Virtual Reality (VR) applications.

FIG. 6 demonstrate a representative architecture of a Pervasive node that provides video service to AR/VR applications.

Step 1.1: An AR/VR application 601 initiates a request to a Pervasive Computing node to create an augmented scenario based on the captured images on the user device. The request may also include weather information and other information of the ambient environment of the user device.

Step 1.2: The application sends this request to a Pervasive node that provides video services 602 in its Field Service module. The Field Service may evaluate information for the ambient environment of the user device. The Field Service module sends a request to Foundation Service module to perform common processing on the captured data.

Step 1.3: After receiving the request, the Foundation Service performs a set of data processing algorithms 603. For example, a set of common image processing algorithm can be performed to process the data.

Step 1.4: The processed data is sent back to the Field Service module so that an augmented scenario is constructed. The scenario is then transmitted back to the application so that the user can view it on the user device.

Example Embodiment 3

This embodiment demonstrates how Pervasive node provides location services for a parking application. To provide location services, algorithms such as Time Difference Of Arrival (TDOA), Observed Time Difference Of Arrival (OTDOA), Uplink Time Difference of Arrival (UTDOA), and/or Activity-On-Arrow (AOA) can be implemented on a Pervasive node. Different Field Services can be constructed to process various types of measurements data from different access modes (e.g., LTE, NB-IoT, Lara, Wi-Fi, etc.) The common location algorithms and processing method can be extracted into the location Foundation Service.

Step 2.1: A navigation application initials a request to look for a parking spot in a parking lot so that it can show the path to the parking spot to the user. The request may also include vehicle size information and other information for the vehicle.

Step 2.2: The application sends this request to a Pervasive node that provides location services in its Field Service module. The Field Service module acquires the current geographic location of the user based on the access method, and sends a request to Foundation Service module to obtain the geographic location of an available parking position.

Step 2.3: After receiving the request, the Foundation Service module instructs the platform to trigger relevant hardware components (e.g., camera or sensor) to collect information. The Foundation Service module then obtain information for a vacant parking position. In some embodiments, the information is sent to another Foundation Service module to map the coordinates corresponding to the geographic location of the parking location. The Foundation Service then perform calculation using the common algorithms.

Step 2.4: The calculated result is then sent back to the Field Service module and forwarded back to the navigation application so that the user can properly view the path. Additional information, such as parking time and fees, can also be included in the data transmitted to the navigation application.

Figure 7:
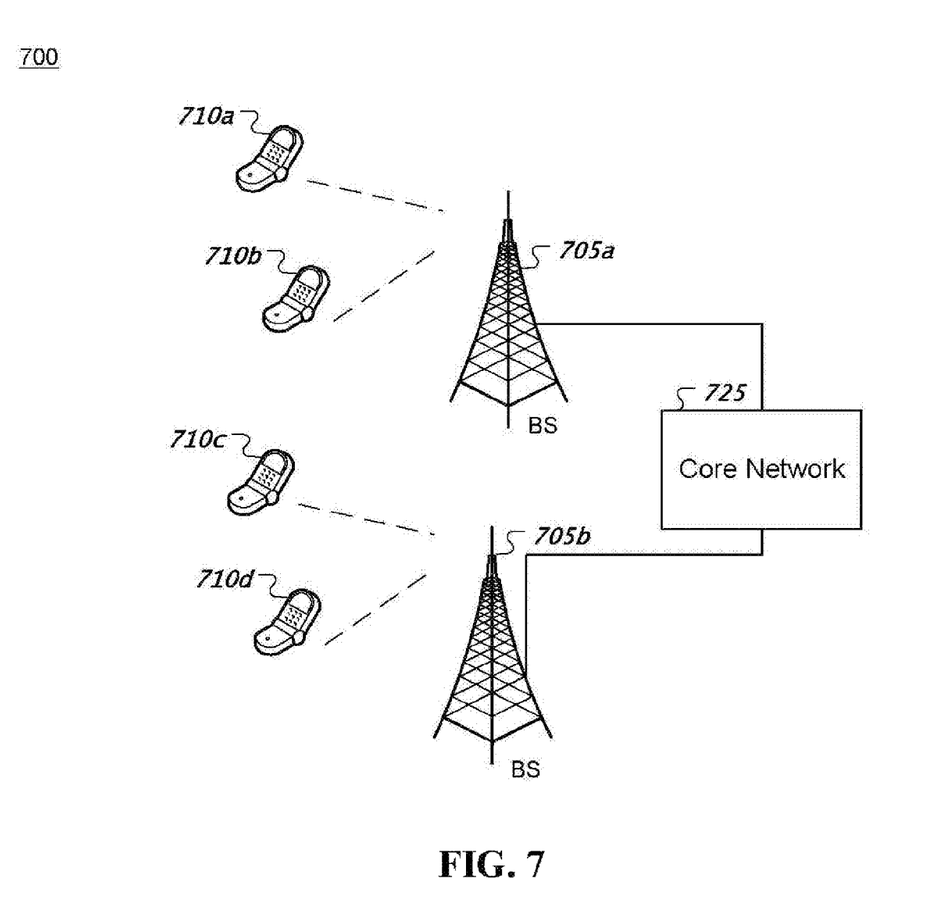
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors. The base station 705a, 705b can also function as a lower-tier Pervasive node to provide computing services to the wireless devices 710a, 710b, 710c, and 710d.

The core network 725 can communicate with one or more base stations 705a, 705b. The core network 725 provides connectivity with other wireless communication systems and wired communication systems. The core network 725 includes various network nodes that function as middle-tier and/or high-tier Pervasive nodes to provide distributed computing capabilities to the wireless devices 710a, 710b, 710c, and 710d.

The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. In some implementations, a wireless communication system can include multiple networks using different wireless technologies. A dual-mode or multi-mode wireless device includes two or more wireless technologies that could be used to connect to different wireless networks.

Figure 8:
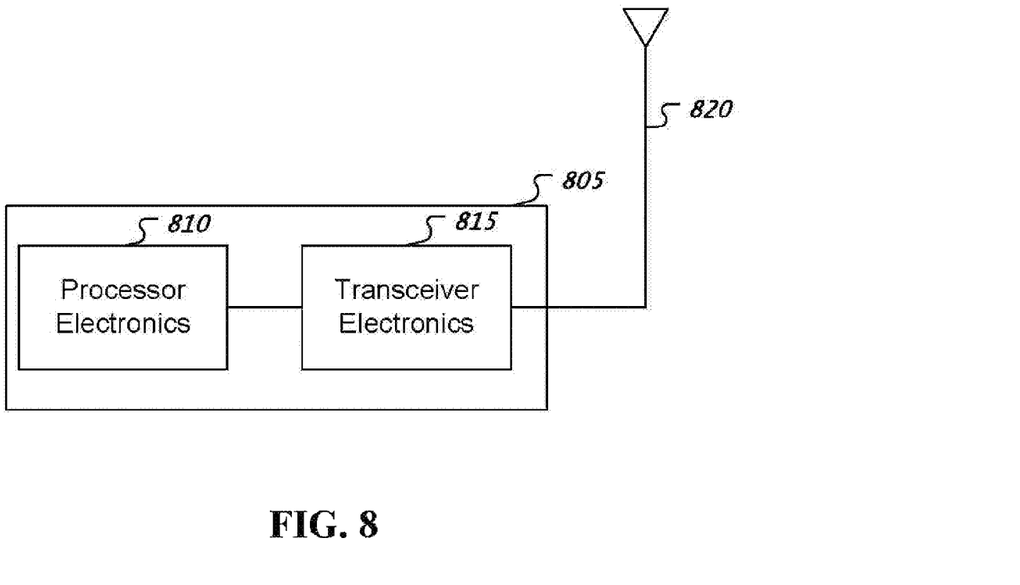
FIG. 8 is a block diagram representation of a portion of a radio station.

FIG. 8 is a block diagram representation of a portion of a radio station. A radio station 805 such as a base station or a wireless device (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805.

It is thus evident that methods, devices, and systems related to a new programming paradigm, Pervasive Computing, are disclosed. The paradigm provides a distributed network that can provide computing capabilities throughout the network communication paths. Using the disclosed techniques, application developers and content providers can focus on development of application-level business logic without wasting development cycles to test and deploy infrastructure-level services.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for application development, comprising:
    making available a first set of services for an application in a domain, wherein the domain corresponds to an industry having a set of business rules, and
    wherein the first set of services is structured to invoke a second set of services pre-deployed on a first set of communication nodes, the second set of services including common functionalities according to the set of business rules in the domain; and
    deploying the first set of services on a second set of communication nodes to enable an execution of a subset of the business rules in the domain that is specific to the application;
    wherein the first set of communication nodes is in a core network for wireless communication, the first set of communication nodes comprising a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

2. The method of claim 1, wherein the second set of communication nodes is in a core network for wireless communication.

3. The method of claim 1, wherein the second set of communication nodes is in an access network for wireless communication.

4. A method for service development, comprising:
    making available a set of services that invokes a set of infrastructure-level components, wherein the set of services includes common functionalities according to a set of business rules in a domain, the domain corresponding to an industry having the sets of business rules, and
    wherein the set of infrastructure-level components includes at least one of a network component, a storage component, or a virtualization component;
    testing the set of services with the set of infrastructure-level components; and
    deploying the set of services to one or more communication nodes in a network that host the set of infrastructure-level components;
    wherein the network includes a core network for wireless communication, and wherein the one or more communication nodes include a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

5. The method of claim 4, wherein the network includes an access network for wireless communication, and wherein the one or more communication nodes include a base station.

6. A method for providing networking and computing services, comprising:
 hosting, at a first communication node in a network, a set of infrastructure-level components that includes at least one of a network component, a storage component, or a virtualization component;
 providing, by a second communication node in the network, a first set of services for an application in the domain to enable an execution of a subset of the business rules in the domain that is specific to the application; and
 providing, by a third communication node in the network, a second set of services that includes common functionalities according to a set of business rules in a domain, wherein the domain corresponds to an industry having the set of business rules;
 wherein the network includes a core network for wireless communication, and wherein the first communication node or the second communication node include a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

7. The method of claim 6, wherein the first communication node and the second communication node are the same.

8. The method of claim 7, wherein the first communication node is in a core network for wireless communication.

9. The method of claim 7, wherein the third communication node is in an access network or a core network for wireless communication.

10. The method of claim 6, wherein the first, second, and third communication nodes are different.

11. The method of claim 7, wherein the first set of services includes at least one of the following: an energy service, a location service, a video service, or a utility service.

12. A device for providing network and computing services, comprising:
 a transceiver coupled to a network for transmitting or receiving information over a communication channel to allow network access by a device; and
 a processor in communication with the transceiver to manage transmitting or receiving the information, wherein the processor is further configured to provide, to the device:
  a first set of services for an application in the domain to enable an execution of a subset of the business rules in the domain that is specific to the application; and
  a second set of services that includes common functionalities according to a set of business rules in a domain, wherein the domain corresponds to an industry having the set of business rules;
 wherein the network includes a core network for wireless communication, and wherein the device includes a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

13. The device of claim 12, wherein the first set of services includes at least one of the following: an energy service, a location service, a video service, or a utility service.

14. A system for providing network and computing services, comprising:
 a first communication node providing network access to a device via an access network; and
 a second communication node in communication with the first communication node, wherein the second communication node comprises a processor configured to provide, to the device:
  (1) a first set of services for an application in the domain to enable an execution of a subset of the business rules in the domain that is specific to the application; and
  (2) a second set of services that includes common functionalities according to a set of business rules in a domain, wherein the domain corresponds to an industry having the set of business rules;
 wherein the network includes a core network for wireless communication, and wherein the first communication node or the second communication node include a Mobility Management Entity (MME), a Serving Gateway(SGW), a Packet Data Network Gateway (PGW), an Access and Mobility Management (AMF), a Session Management Function (SMF), a Network Slice Selection (NSS), Network Exposure Function (NEF), a Network Repository Function, a User Plane (UP), a Unified Data Management (UDM), a Network Function Repository, an Authentication Server (AUSF), or a Policy Control Function (PCF).

15. The system of claim 14, wherein the second communication node includes a serving gateway or a packet data network gateway.

16. The system of claim 14, wherein the first set of services includes at least one of the following: an energy service, a location service, a video service, or a utility service.

17. The system of claim 14, wherein the first communication node comprises a processor configured to provide, to the device:
 (1) a third set of services for the application in the domain to enable an execution of a subset of the business rules in the domain that is specific to the application; and
 (2) a fourth set of services that includes common functionalities according to the set of business rules in the domain.

18. The system of claim 14, wherein the third set of services is a subset of the first set of services or is the same as the first set of services.

19. The system of claim 14, wherein the fourth set of services is a subset of the second set of services or is the same as the second set of services.

* * * * *